United States Patent
Pudipeddi et al.

(10) Patent No.: US 8,583,708 B2
(45) Date of Patent: Nov. 12, 2013

(54) EXTENSIBLE FILE SYSTEM

(75) Inventors: Ravisankar V. Pudipeddi, Bellevue, WA (US); Vishal V. Ghotge, Seattle, WA (US); Sarosh C. Havewala, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 137 days.

(21) Appl. No.: 12/052,584

(22) Filed: Mar. 20, 2008

(65) Prior Publication Data

US 2008/0168029 A1 Jul. 10, 2008

Related U.S. Application Data

(62) Division of application No. 11/229,485, filed on Sep. 16, 2005.

(60) Provisional application No. 60/637,407, filed on Dec. 17, 2004.

(51) Int. Cl.
*G06F 17/30* (2006.01)

(52) U.S. Cl.
USPC ........................................................ 707/822

(58) Field of Classification Search
USPC ................... 707/827, 828, 822, 705; 709/217
See application file for complete search history.

(56) References Cited

U.S. PATENT DOCUMENTS

| | | | |
|---|---|---|---|
| 4,780,821 A | 10/1988 | Crossley | |
| 4,987,531 A | 1/1991 | Nishikado | |
| 5,083,264 A | 1/1992 | Platteter | |
| 5,202,982 A | 4/1993 | Gramlich et al. | |
| 5,307,494 A | 4/1994 | Yasumatsu | |
| 5,313,646 A | 5/1994 | Hendricks | |
| 5,359,725 A | 10/1994 | Garcia | |
| 5,363,487 A | 11/1994 | Willman | |
| 5,367,671 A | 11/1994 | Feigenbaum | |
| 5,371,885 A | 12/1994 | Letwin | |
| 5,388,257 A | 2/1995 | Bauer | |
| 5,392,427 A | 2/1995 | Barrett | |
| 5,412,808 A * | 5/1995 | Bauer | 707/822 |
| 5,421,001 A * | 5/1995 | Methe | 1/1 |
| 5,434,974 A | 7/1995 | Loucks | |
| 5,437,029 A | 7/1995 | Sinha | |
| 5,483,652 A | 1/1996 | Sudama | |

(Continued)

FOREIGN PATENT DOCUMENTS

| | | |
|---|---|---|
| EP | 0462587 A2 | 12/1991 |
| EP | 0618540 A2 | 10/1994 |

(Continued)

OTHER PUBLICATIONS

Karpovic et al., ExtensibLe File Systems (ELFS): An Object-Oriented Approach to High Performance File I/O, 1994, pp. 191-204.*

(Continued)

*Primary Examiner* — Sherief Badawi
(74) *Attorney, Agent, or Firm* — Woodcock Washburn, LLP

(57) ABSTRACT

An extensible file system format for portable storage media is provided. The extensible file system format includes the specification of primary and secondary directory entry types that may be custom defined. The primary and secondary directory entry types can be further classified as critical and benign directory entries.

17 Claims, 6 Drawing Sheets

(56) References Cited

U.S. PATENT DOCUMENTS

| | | | |
|---|---|---|---|
| 5,535,375 | A | 7/1996 | Eshel |
| 5,579,517 | A | 11/1996 | Reynolds |
| 5,596,755 | A | 1/1997 | Pletcher |
| 5,627,996 | A | 5/1997 | Bauer |
| 5,694,606 | A | 12/1997 | Pletcher |
| 5,745,752 | A | 4/1998 | Hurvig |
| 5,745,902 | A | 4/1998 | Miller |
| 5,754,848 | A | 5/1998 | Hanes |
| 5,758,352 | A | 5/1998 | Reynolds |
| 5,761,675 | A | 6/1998 | Isenberg |
| 5,761,677 | A | 6/1998 | Senator |
| 5,765,169 | A | 6/1998 | Conner |
| 5,819,275 | A | 10/1998 | Badger |
| 5,898,868 | A | 4/1999 | Krueger |
| 5,923,884 | A | 7/1999 | Peyret et al. |
| 5,926,805 | A | 7/1999 | Hurvig |
| 5,930,828 | A | 7/1999 | Jensen et al. |
| 6,023,744 | A | 2/2000 | Shoroff et al. |
| 6,055,527 | A | 4/2000 | Badger |
| 6,081,804 | A | 6/2000 | Smith |
| 6,144,969 | A | 11/2000 | Inokuchi et al. |
| 6,205,558 | B1 | 3/2001 | Sobel |
| 6,253,300 | B1 | 6/2001 | Lawrence et al. |
| 6,374,265 | B1* | 4/2002 | Chen et al. ............................ 1/1 |
| 6,612,490 | B1 | 9/2003 | Herrendoerfer et al. |
| 6,615,365 | B1 | 9/2003 | Jenevein et al. |
| 6,654,772 | B1 | 11/2003 | Crow et al. |
| 7,032,107 | B2 | 4/2006 | Stutton et al. |
| 7,072,917 | B2* | 7/2006 | Wong et al. ................... 707/693 |
| 7,274,857 | B2 | 9/2007 | Nallur et al. |
| 7,380,140 | B1 | 5/2008 | Weissman et al. |
| 7,383,288 | B2* | 6/2008 | Miloushev et al. ................... 1/1 |
| 7,620,620 | B1* | 11/2009 | Sedlar ................................ 1/1 |
| 7,676,491 | B2* | 3/2010 | Jansen et al. ........................ 1/1 |
| 7,747,664 | B2 | 6/2010 | Patel et al. |
| 7,757,100 | B2 | 7/2010 | Weissman et al. |
| 7,873,596 | B2 | 1/2011 | Pudipeddi et al. |
| 7,941,435 | B2 | 5/2011 | Kao et al. |
| 7,979,409 | B2* | 7/2011 | Kime .......................... 707/705 |
| 2002/0062301 | A1* | 5/2002 | Rudoff et al. ..................... 707/1 |
| 2003/0088587 | A1* | 5/2003 | Merrells et al. ............... 707/201 |
| 2003/0135650 | A1* | 7/2003 | Kano et al. ................... 709/248 |
| 2003/0177107 | A1* | 9/2003 | Brown et al. ..................... 707/1 |
| 2003/0182330 | A1* | 9/2003 | Manley et al. ................ 707/205 |
| 2003/0221095 | A1 | 11/2003 | Gaunt et al. |
| 2004/0064483 | A1 | 4/2004 | Bulka et al. |
| 2004/0215600 | A1 | 10/2004 | Aridor |
| 2005/0015354 | A1 | 1/2005 | Grubbs et al. |
| 2005/0172005 | A1* | 8/2005 | Goodwin ...................... 709/211 |
| 2006/0136529 | A1* | 6/2006 | Pudipeddi et al. ............ 707/205 |
| 2006/0224578 | A1 | 10/2006 | Kadatch et al. |
| 2008/0091702 | A1 | 4/2008 | Pudipeddi et al. |
| 2008/0168029 | A1 | 7/2008 | Pudipeddi et al. |
| 2008/0172426 | A1 | 7/2008 | Patel et al. |
| 2008/0215646 | A1 | 9/2008 | Pudipeddi et al. |
| 2008/0215647 | A1 | 9/2008 | Pudipeddi et al. |
| 2009/0164440 | A1 | 6/2009 | Pudipeddi et al. |
| 2009/0164539 | A1 | 6/2009 | Pudipeddi et al. |
| 2009/0265400 | A1 | 10/2009 | Pudipeddi et al. |

FOREIGN PATENT DOCUMENTS

| | | | |
|---|---|---|---|
| EP | 1677214 | A1 | 7/2006 |
| JP | 64-041039 | A | 2/1989 |
| JP | 01-315843 | A | 12/1989 |
| JP | 02-148341 | A | 6/1990 |
| JP | 03-017753 | A | 1/1991 |
| JP | 04-188239 | A | 7/1992 |
| JP | 60-19763 | A | 1/1994 |
| JP | 07-234879 | | 9/1995 |
| JP | 2001-160068 | | 6/2001 |
| JP | 2001-325134 | | 11/2001 |
| JP | 2004-288007 | | 10/2004 |
| RU | 2159467 | C2 | 11/2000 |

OTHER PUBLICATIONS

Khalidi et al. Extensible File Systems in Spring, Sep. 1993, pp. 1-18.*
Russian Office Action issued Dec. 14, 2009 citing the Russian counterpart (RU 2159467).
"Above Software Introduces 'Golden Retriever 2.0b'," News Release, Dateline: Irvine, California, Mar. 29, 1993.
Bonner, P., "What's in a Name?" PC/Computing 2(9):169(2), Sep. 1989.
Bonner, P., "Build a Document Manager Under Windows," PC/Computing 4(12):275(7), Dec. 1991.
Duncan, R., "Design Goals and Implementation of the New High Performance File System," Microsoft Systems Journal 4(5):1-13, Sep. 1989.
Duncan, R., "Power Programming Using Long Filenames and Extended Attributes, Part I," PC Magazine 9(8):317-322, Apr. 24, 1990.
Duncan, R., "Power Programming Using Long Filenames and Extended Attributes, Part II," PC Magazine 9(9):305-310, May 15, 1990.
"File Sharing Protocol," Microsoft Corporation, Nov. 7, 1988.
Glass, B., "Create Your Own Environment," PC-Computing 3(10):106-110, Oct. 1990.
Hurwicz, M., "MS-DOS 3.1 Makes It Easy to Use IBM PCs on a Network," Data Communications, Nov. 1985, pp. 223-237.
"The Intelligent Way to Search," News Release, Dateline: Burlington, Massachusetts, Oct. 1987.
Leffler, S.J., et al., "The Design and Implementation of the 4.3BSD UNIX Operating System," Addison-Wesley Publishing Company, New York, 1989, Chap. 2, "Design Overview of 4.3BSD," pp. 34-36.
"Long Filenames," Article 15, pp. 19-47, date unknown.
Mallory, J., "Breakthrough on DOS Filename Limits," Newsbytes News Network, Apr. 12, 1993, <http://calbears.findarticles.com/p/articles/mi_m0NEW/is_1993_April_12/ai_13786607/print> [retrieved May 24, 2006].
McCormick, J., "Presentation Manager Under OS/2 Encourages Lengthy Name-Calling," Government Computer News 9(10):16, 18, May 14, 1990.
Lent, A.F., and S. Miastkowski, "New, Improved Windows," PC World 11(12):252(17), Dec. 1993.
O'Malley, C., "Fetching Desktop Files: Standalone Document Managers," Windows Sources 1(2):443-444, Mar. 1993.
Rohan, R., "Golden Retriever Fetches Files in Windows," Computer Shopper 12(11):947, Nov. 1992.
Tanenbaum, A.S. (ed.), MINIX Operating System, Keiichiro Sakamoto, Tokyo, Japan, 1989, Chap. 5, "File System," pp. 310-313 (English translation of Japanese publication).
Trivette, D.B., "Utility Provides 60-Character Filenames," PC Magazine 7(16):56, Sep. 27, 1988.
Wang, Y.E.G., "Universal_File_Names for Ada," Ada Letters 10(1):111-117, Jan./Feb. 1990.
"World Software Corporation (WSC) Launches Extend-a-name in Europe," Computer Product Update, Jul. 27, 1990.
Tanenbaum, A.S., "Modern Operating Systems," 2nd ed., Prentice Hall, Englewood Cliffs, NJ, 2001, pp. 442-445, 830-841.
"Long Filenames"; Windows 95 Beta 2 Release SDK; Article 15; Oct. 28, 1994; pp. 19-47.
EP Application No. 10012810.7: Extended European Search Report, Jan. 21, 2011, 5 pages.
U.S. Appl. No. 11/229,485, Non-Final Office Action dated Nov. 7, 2007, 14 pages.
U.S. Appl. No. 11/229,485, Final Office Action dated Jul. 16, 2008, 12 pages.
U.S. Appl. No. 11/229,485, Non-Final Office Action dated Jan. 15, 2009, 11 pages.
U.S. Appl. No. 11/229,485, Final Office Action dated Aug. 18, 2009, 9 pages.
U.S. Appl. No. 11/229,485, Non-Final Office Action dated Feb. 22, 2010, 11 pages.
U.S. Appl. No. 11/229,485, Final Office Action dated Nov. 12, 2010, 17 pages.
U.S. Appl. No. 12/052,594, Non-Final Office Action dated Aug. 6, 2010, 16 pages.

(56) References Cited

OTHER PUBLICATIONS

U.S. Appl. No. 12/052,594, Final Office Action dated Apr. 18, 2011, 23 pages.
U.S. Appl. No. 12/493,172, Non-Final Office Action dated Aug. 31, 2011, 16 pages.
Takenori Yamamori, "Guide to Rise Higher than a Novice, PC UNIX Deciphered from Boot Files," Software Design, No. 131, pp. 110-121, Gijutsu-Hyohron Co., Ltd., Japan, Sep. 18, 2001.
Hiroo Shirasaki, "Observe the Boot Process of FreeBSD 14," UNIX Magazine, vol. 20, No. 2, pp. 91-99, ASCII Corporation, Japan, Feb. 1, 2005.
Japanese Patent Application No. 2012-040595: English translation of Notice of Rejection mailed on Mar. 26, 2013, 2 pages.
U.S. Appl. No. 11/229,485: Final office action dated Oct. 17, 2012, 18 pages.
U.S. Appl. No. 12/052,594: Final office action dated Jan. 17, 2013, 24 pages.
U.S. Appl. No. 12/493,172: Non-final office action dated Mar. 14, 2013, 34 pages.
U.S. Appl. No. 11/229,485, Non-Final Office Action dated Mar. 30, 2012, 20 pages.
U.S. Appl. No. 12/052,594, Non-Final Office Action dated Jun. 12, 2012, 21 pages.
U.S. Appl. No. 12/493,172, Final Office Action Apr. 24, 2012, 25 pages.

* cited by examiner

Fig.4.

| NAME | SIZE |
|---|---|
| OEM NAME | 3 |
| DATA SIZE DESCRIPTORS | X |
| ACTIVE FAT | 2 |
| VOLUME SERIAL NUMBER | 4 |
| FILE SYSTEM TYPE | X |

Fig.5.

| NAME | SIZE |
|---|---|
| IN USE | 1:1 |
| TYPE | 1:7 |
| SECONDARY ENTRIES | 1 |
| ATTRIBUTES | 2 |
| TIME | X |
| TIME ZONE | 1 |

Fig.6.

| NAME | SIZE |
|---|---|
| IN USE | 1:1 |
| TYPE | 1:7 |
| CHARACTERS | 1 |
| NAME HASH | 2 |
| FILE NAME | 28 |

Fig.7.

| NAME | SIZE |
|---|---|
| IN USE | 1:1 |
| TYPE | 1:7 |
| SECONDARY ENTRIES | 1 |
| GUID | 16 |

| NAME | SIZE |
|---|---|
| IN USE | 1:1 |
| TYPE | 1:7 |
| ACL INFORMATION | X |

*Fig.10.*

| NAME | SIZE |
|---|---|
| IN USE | 1:1 |
| TYPE | 1:7 |
| SECONDARY ENTRIES | 1 |
| GUID | 16 |
| OTHER | X |

*Fig.8.*

| NAME | SIZE |
|---|---|
| IN USE | 1:1 |
| TYPE | 1:7 |
| SECONDARY | 16 |
| GUID | 16 |
| OTHER | X |

*Fig.9.*

EXTENSIBLE FILE SYSTEM

CROSS-REFERENCES TO RELATED APPLICATIONS

This application is a divisional of application Ser. No. 11/229,485, entitled EXTENSIBLE FILE SYSTEM, and filed on Sep. 16, 2005, which in turn claims the benefit of Provisional Application No. 60/637,407, entitled FILE SYSTEM FORMAT FOR PORTABLE MEDIA, and filed on Dec. 17, 2004.

BACKGROUND

Generally described, there are a number of portable computing devices, such as digital still cameras, digital video cameras, media players, mobile phones, mobile computing devices, personal digital assistants, and the like that maintain data on a storage media, such as a portable storage media. The continued development of more complex portable computing devices and larger storage capacity portable storage media places a greater demand for flexibility on the file system format used on the storage media. Current file system format approaches can become deficient in that they may provide adequate flexibility for increasing storage size capacities and/or storage media applications.

SUMMARY

An extensible file system format for portable storage media is provided. The extensible file system format includes the specification of primary and secondary directory entry types that may be custom defined. The primary and secondary directory entry types can be further classified as critical and benign directory entries.

In accordance with an aspect of the present invention, a computer-readable medium having computer-executable components for storing data is provided. The computer-readable components can include a boot parameters component for specifying boot parameters for a file system. The computer-readable components also include a file allocation table component for defining a file allocation table associated with the file system. Additionally, the computer-readable components include a primary directory entry component for specifying data in a root directory of the file system. Still further, the computer-readable components include at least one secondary entry component corresponding to the primary directory entry component. The secondary entry component defines defining meta data associated with the primary directory entry component. The primary and secondary directory entry components can be further classified as critical or benign.

In accordance with another aspect of the present invention, a computer-readable medium having computer-executable components for storing data is provided. The computer-readable components include a boot parameters component for specifying boot parameters for a file system. The computer-readable components also include a file allocation table component for defining a file allocation table associated with the file system. Still further, the computer-readable components include a root directory component for specifying data in a root directory of the file system. Additionally, the computer-readable components include at least extensible one meta data component corresponding to the root directory entry component. The meta data component defines meta data associated with the root directory component.

In an illustrative embodiment, a file system will not mount a volume for a critical primary or root directory entry that is not recognized. The file system can ignore benign primary directory entries, critical secondary directory entries and benign secondary directory entries that are not recognized.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a block diagram illustrative of data components for implementing a boot process block in an extensible file system format in accordance with an aspect of the present invention;

FIG. 5 is a block diagram illustrative of data components for implementing directory entries in an extensible file system format in accordance with an aspect of the present invention FIG. 6 is a block diagram illustrative of data components for implementing a file name and extensions in an extensible file system format in accordance with an aspect of the present invention;

FIG. 7 is a block diagram illustrative of data components for implementing a volume identifier in an extensible file system format in accordance with an aspect of the present invention;

FIG. 8 is a block diagram illustrative of data components for implementing an extensible directory entry in an extensible file system format in accordance with an aspect of the present invention;

FIG. 9 is a block diagram illustrative of data components for implementing an extensible directory entry in an extensible file system format in accordance with an aspect of the present invention;

FIG. 10 is a block diagram illustrative of data components for implementing an access control list in an extensible file system format in accordance with an aspect of the present invention.

DETAILED DESCRIPTION

Generally described, the present invention relates to an extensible file system format and various processes associated with the extensible file system format. In an illustrative embodiment, the extensible file system format corresponds to an extensible file system format for portable storage media and various processes associated with the extensible file system format on the portable storage media. Although the present invention will be described with regard to a portable storage media file system format, one skilled in the relevant art will appreciate that the disclosed embodiments are illustrative in nature and should not be construed as limiting. Additionally, one skilled in the relevant art will appreciate that the data structures and data layouts used in the illustrative examples may require additional information related to performance, security, and the like.

Figure 1:
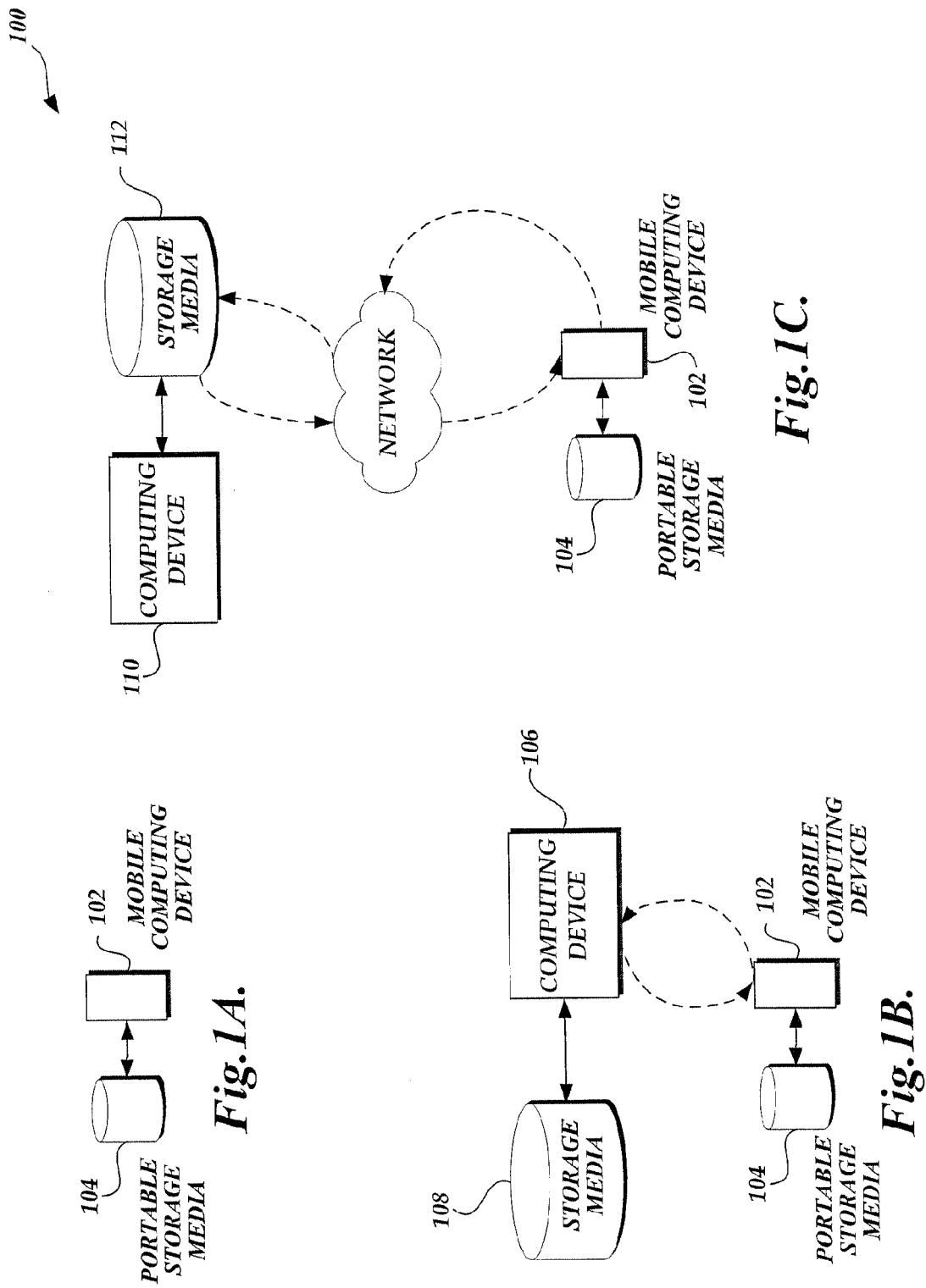
FIGS. 1A-1C are block diagrams illustrative of an illustrative environment including a portable computing device and a storage device implementing the extensible file system format in accordance with an aspect of the present invention.

FIGS. 1A-1C are block diagrams illustrative of various operating environments 100 for the extensible file system format of the present invention. With reference to FIG. 1A, in an illustrative embodiment, the extensible file system format is utilized to store data from a computing device, such as a mobile computing device 102, and a storage media, such as a portable storage media 104. In an illustrative embodiment, the mobile computing device 102 can correspond to any one of a variety of computing devices, including but not limited to, portable computing devices, mobile telephones, personal digital assistants, music players, media players. The portable storage media can also include, but is not limited to, hard drives, flash media, micro-drives and other storage media. In an illustrative embodiment, the extensible file system on the portable storage media 104 does not have to include any type of executable or readable software components, such as an operating environment, utilized by the mobile computing device 102. Alternatively, the extensible file system on the portable storage media 104 may include executable or readable software components used by the mobile device 102.

In an illustrative embodiment, the mobile computing device 102 may be in communication with other computing devices for collecting/exchanging data to be stored on the portable storage media 104. With reference to FIG. 1B, the mobile computing device 102 may be in direct communication with another computing device 106 and storage media 108. In an illustrative embodiment, the direct communication can correspond to various wired and wireless communication methods. In an illustrative embodiment, the other storage media 108 is not required to be formatted in accordance with the extensible file system format of the present invention. With reference to FIG. 1C, in a similar manner, the mobile computing device 102 may also be in communication with another computing device 110 and storage media 112, via a network connection. In an illustrative embodiment, the network connection can correspond to local area network (LAN) and wide are network (WAN) connections.

Figure 2:
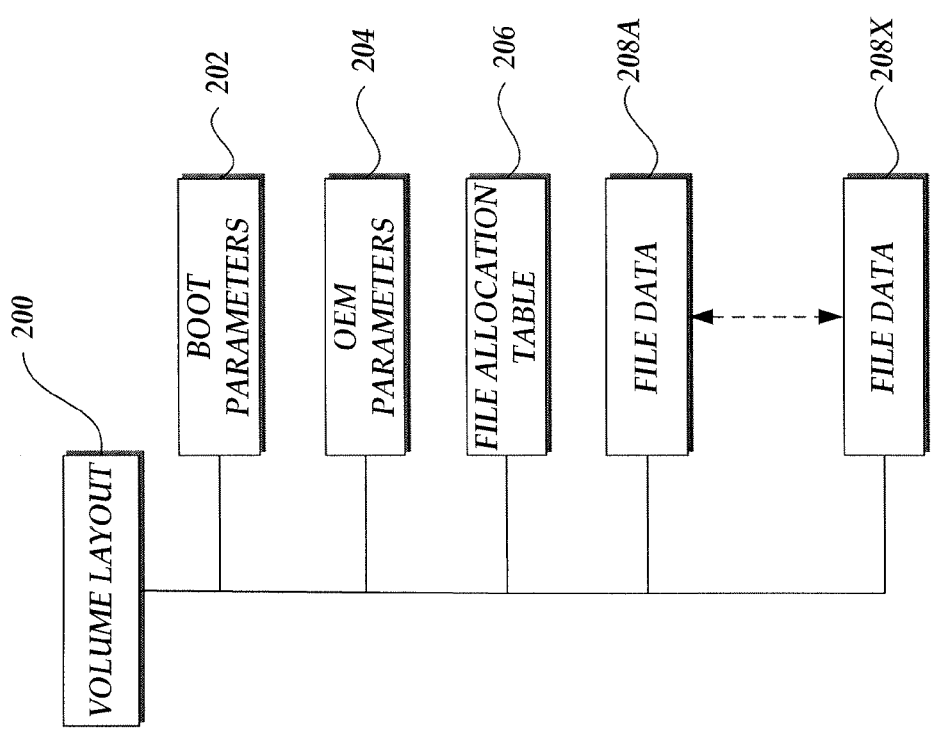
FIG. 2 is a block diagram illustrative of various volume layout components corresponding to an extensible file system format in accordance with an aspect of the present invention.

With reference now to FIG. 2, an illustrative embodiment volume layout 200 for an extensible file system format will be described. The volume layout 200 includes a boot parameters component 202 that include various information related to a description of the file system parameters of the partition. In an illustrative embodiment, the boot parameters component 202 can include code for bootstrapping from a defined partition, fundamental file system parameters for the defined partition, and various error checking information. A data structure for defining at least a portion of the boot parameters will be described below with regard to FIG. 4.

The volume layout 200 also includes an extensible parameters component, designated as OEM parameters 204, that define various additional data structures used in conjunction with the file system. In an illustrative embodiment, an original equipment manufacture (OEM) may specify various extensible data structures, such as performance parameters for a storage medium, that can be defined at time of manufacture.

The volume layout 200 can further include a file allocation table component 206 that defines file and directory allocations. In an illustrative embodiment, each entry in the file allocation table component 206 corresponds to a 32-bit entry that represents an allocated cluster, an unallocated cluster or an unusable cluster. The volume layout 200 can still further include series of file data components 208A-208X that correspond to the data stored according to the file system format. Various data structures for defining a portion of the file data components 208A-208X will be defined with regard to FIGS. 3-10.

Figure 3:
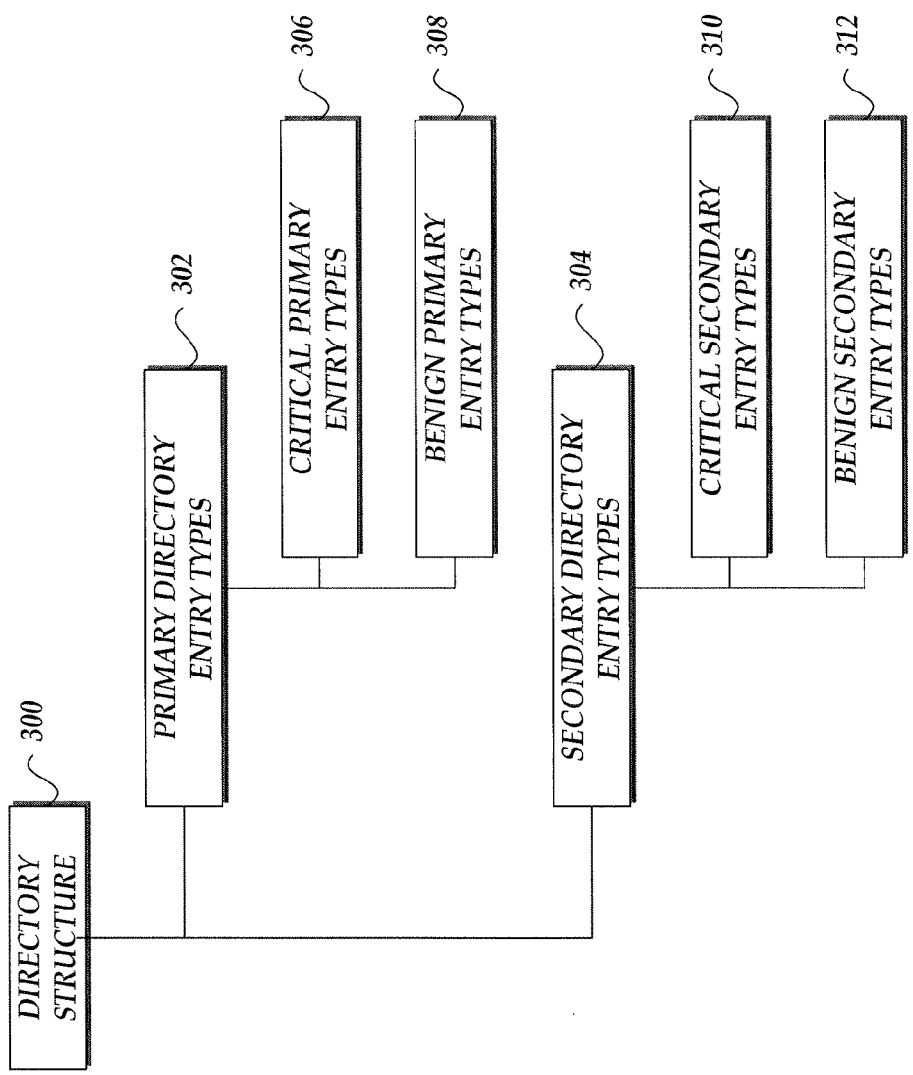
FIG. 3 is a block diagram illustrative of an extensible file system directory structures including primary and secondary directory entry structures in accordance with an aspect of the present invention.

Turning now to FIG. 3, in one aspect, the file data components 208 may include one or more directory entries according to a directory structure 300. In an illustrative embodiment, directory structure 300 is organized into primary directory entries 302 and secondary directory entries 304. Each directory entry in the primary and secondary entries is typed. For example, in an illustrative embodiment, type values for the primary and secondary directory entries can correspond to a range of 1-255. Primary directory entries 302 correspond to the entries in the root directory of the file system. Secondary directory entries 304 follow a primary directory entry and are associated with the primary directory entry. Secondary directory entries extend the metadata associated with the correlated primary directory entry.

With continued reference to FIG. 3, in an illustrative embodiment, the primary directory entries 302 can be further classified as critical primary directory entries 306 and benign primary directory entries 308. Critical primary directory entries 306 define potentially different formats for each directory entry. In an illustrative embodiment, an operating environment will not mount a volume corresponding to the extensible file system format with an unknown critical primary directory entry, as will be described below. Examples of known primary directory entries 306 can include allocation bitmaps, up-case tables, volume labels, encryption keys, and normal directory entries. Benign primary directory entries 308 also define potential different formats for each directory entry, but can be ignored by the file system if a particular benign primary directory entry is not understood. Benign primary directory entries 308 can be associated with another cluster chain the volume. Additionally, benign primary directory entries 308 can also be associated a number of secondary directory entries 304.

In a manner similar to primary directory entries 302, secondary directory entries 304 may also be further classified as critical secondary directory entries 310 and benign secondary directory entries 312. As described above, the critical secondary directory entries 310 and benign secondary directory entries 312 are associated with a benign primary directory entry and extend the metadata associated with the primary directory entry. Both the critical secondary directory entries 310 and the benign secondary directory entries 312 can be associated with another cluster chain the volume.

To mount a corresponding to the extensible file system format, the file system implements a mount volume procedure. In an illustrative embodiment, the mount volume procedure attempts to a look at a version number for the volume. If the version number is not understood (e.g., the version number is higher), the volume will not be mounted. During a normal directory enumeration, any critical primary directory entries not known by the file system will prevent the volume from being mounted. Thereafter, various user-initiated processes, such as a file open, will cause the file system to enumerate the secondary directory entries. If the critical secondary directory entries 310 are not known by a file system, the entire directory entry will be skipped. Additionally, if benign secondary directory entries 312 are not known by the file system, the particular unknown benign secondary directory entry will be ignored.

With reference now to FIG. 4, a block diagram illustrative of data components 400 for implementing a boot process block in the boot parameters component 202 (FIG. 2) will be described. The data components 400 include an OEM name component 402 for specifying a name for the file system format of the storage media. The data components 400 also include a data size descriptor component 404 for specifying various characteristics of the data stored in the file system. For example, the data size descriptor component 404 can specify a count of bytes per sector, a number of sectors per allocation unit, a FAT table offset, and a count of sectors for all data structures. The data components include an active FAT flags component 406 for specifying a number of active FATs on the file system. In an illustrative embodiment, a file system may support multiple FATs for utilization with some operating system environments. The data components 400 can further include a volume identification component 408 for identifying a volume serial number and/or version number. Still further, the data components 400 can include a file system type for specifying the file system format for the file system. One skilled in the relevant art will appreciate that the data components 400 can include a number of additional/alternative rows for implementing the above-identified components 402-410 and additional components.

Turning now to FIG. 5, a block diagram illustrative of data components 500 for implementing directory entries in an extensible file system format will be described. The data components 500 include an in use component 502 for specifying whether the particular directory entry is in use. In an illustrative embodiment, the high bit of the data components will be set to "1" if the directory entry is in use. The data components 500 further include a type designation component 504 for specifying that the directory entry is associated with a normal directory entry. The data components 500 further include a secondary directory entries component 504 for specifying a number of secondary entries associated with the normal directory entry. The data components 500 also include a file attributes component 508 for specifying various file system attributes for the directory entry. Still further, the data components 500 include a time component 510 for specifying various time information such as a creation timestamp, modification time stamp and other time information. Additionally, the data components 500 further include a time zone component 512 for specifying a time zone for the last created time stamp. One skilled in the relevant art will appreciate that the data components 500 can include a number of additional/alternative rows for implementing the above-identified components 502-512 and additional components.

Turning now to FIG. 6, a block diagram data components 600 for implementing a file name and extensions will be described. The data components 600 include an in use component 602 for specifying whether the particular directory entry is in use. In an illustrative embodiment, the high bit of the data components will be set to "1" if the directory entry is in use. The data components 600 further include a type designation component 604 for specifying that the directory entry is associated with a file system name. The data components further include a file name length component 606 and a file name has component 608. The utilization of the file name hash component 608 will be described below. The data components 600 also include a file name component 610 for specifying the file name. One skilled in the relevant art will appreciate that the data components 600 can include a number of additional/alternative rows for implementing the above-identified components 602-610 and additional components. Additionally, file name directory entries may be extended by secondary directory entries.

Turning now to FIG. 7, a block diagram illustrative of data components 700 for implementing a volume identifier in an extensible file system format is provided. The data components 700 include an in use component 702 for specifying whether the particular directory entry is in use. In an illustrative embodiment, the high bit of the data components will be set to "1" if the directory entry is in use. The data components 700 further include a type designation component 704 for specifying that the directory entry is associated with a volume identifier. The data components 700 further include a secondary directory entries component 706 for specifying a number of secondary entries associated with the volume identifier. The data components 700 also include a volume identifier 708, such as a global unique identifier. One skilled in the relevant art will appreciate that the data components 700 can include a number of additional/alternative rows for implementing the above-identified components 702-708 and additional components. Additionally, in an illustrative embodiment, the data components 700 correspond to a benign directory entry that can be ignored by a file system that does not support volume identifiers.

With reference now to FIGS. 8 and 9, in an illustrative embodiment, parties, such as an OEM, may be able to define specific benign primary directory entry types 308 and benign secondary directory entry types 312. As discussed above, in the event the file system would not recognize or understand either the specific benign primary directory entry types 308 or benign secondary directory entry types 312, the file system could ignore the defined directory entry types.

With reference to FIG. 8, a block diagram illustrative of data components 800 for implementing an extensible benign primary directory entry 308 in an extensible file system format will be described. The data components 800 include an in use component 802 for specifying whether the particular directory entry is in use. In an illustrative embodiment, the high bit of the data components will be set to "1" if the directory entry is in use. The data components 800 further include a type designation component 804 for specifying that the directory entry is a benign primary directory entry. The data components 800 further include a secondary directory entries component 806 for specifying a number of secondary entries associated with the volume identifier. The data components 800 also include a volume identifier 808, such as a global unique identifier. The data components 800 can further include additional information 810, such as verification information and a starting cluster. One skilled in the relevant art will appreciate that the data components 800 can include a number of additional/alternative rows for implementing the above-identified components 802-506 and additional components.

With reference to FIG. 9, a block diagram illustrative of data components 900 for implementing a benign secondary directory entry in an extensible file system format will be described. The data components 900 include an in use component 902 for specifying whether the particular directory entry is in use. In an illustrative embodiment, the high bit of the data components will be set to "1" if the directory entry is in use. The data components 900 further include a type designation component 904 for specifying that the directory entry is a benign primary directory entry. The data components 900 further include a secondary directory entries component 906 for specifying a number of secondary entries associated with the volume identifier. The data components 900 also include a volume identifier 908, such as a global unique identifier. The data components 900 can further include additional information 910, such as verification information and a starting cluster. One skilled in the relevant art will appreciate that the data components 900 can include a number of additional/alternative rows for implementing the above-identified components 902-906 and additional components.

In an illustrative embodiment, a benign primary directory entry and/or secondary directory entries may be associated with access control list (ACL) information. FIG. 10 is a block diagram illustrative of data components 1000 for implementing an access control list in an extensible file system format. The data components 1000 include an in use component 1002 for specifying whether the particular directory entry is in use. In an illustrative embodiment, the high bit of the data components will be set to "1" if the directory entry is in use. The data components 1000 further include a type designation component 1004 for specifying that the directory entry is an ACL directory entry. The data components 1000 further include a number of ACL fields 1006, such as ACL flags, pointers to ACL databases, and the like. One skilled in the relevant art will appreciate that the data components 1000 can include a number of additional/alternative rows for implementing the above-identified components 1002-1006 and additional components.

Figure 11:
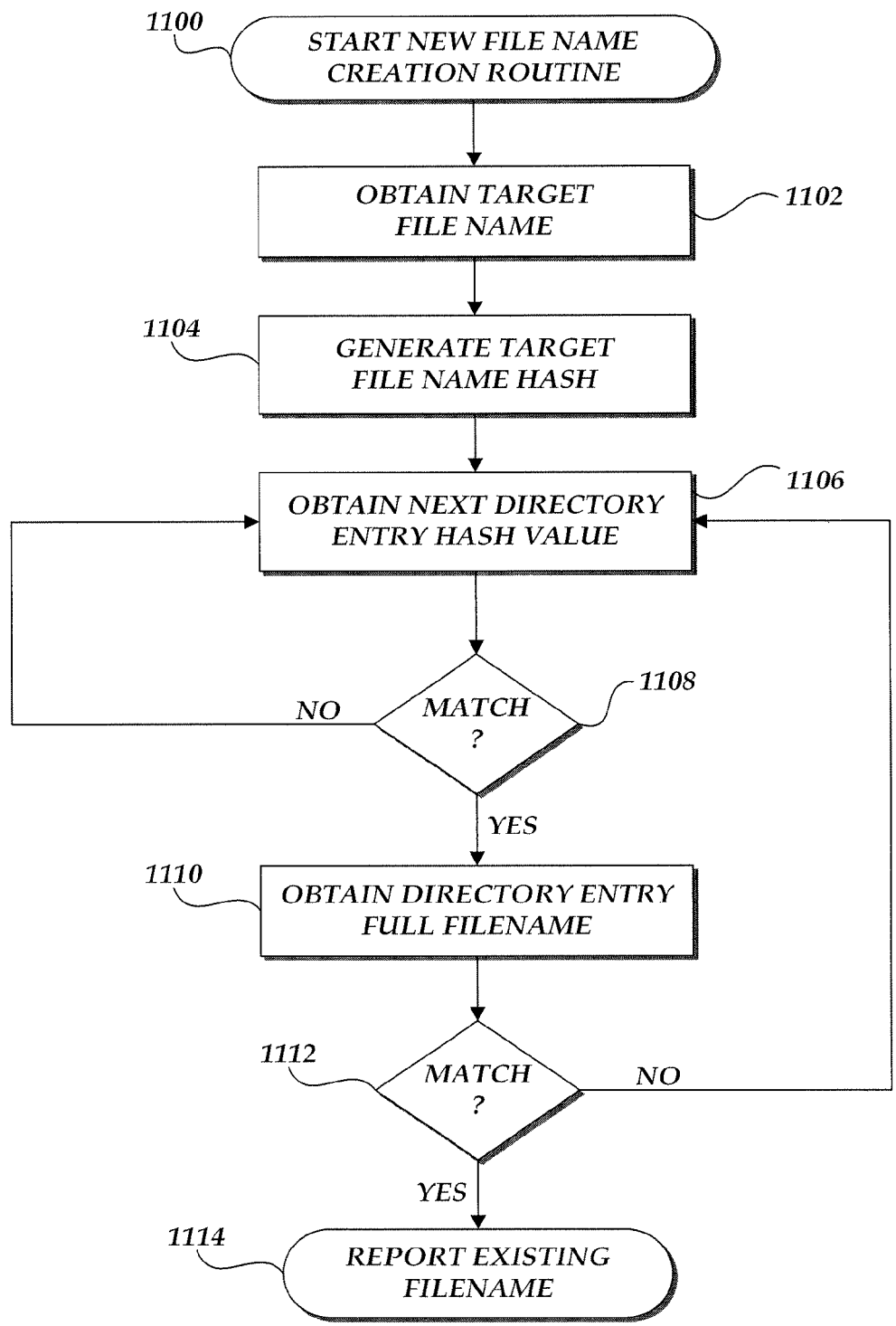
FIG. 11 is a flow diagram illustrative of a file name creation routine for an extensible file system format in accordance with an aspect of the present invention.

With reference now to FIG. 11, a file name creation routine 1100 for an extensible file system format will be described. At block 1102, a file system obtains a request to create a directory entry with a specific file name. In an illustrative embodiment, the specific file name can correspond to a naming convention, such as a digital camera picture naming convention. At block 1104, the file system generates a target name hash. At block 1106, an iterative loop is begun by examining the next directory entry hash value. An illustrative directory entry type for storing directory entry hash values is described above with regard to data components 600 (FIG. 6).

At decision block 1108, a test is conducted to determine whether the target hash value matches the current directory entry hash value. If they do not match, the routine 1100 returns to block 1106 (until all the directory entries have been examined. If the hash values match at decision block 1108, at block 1110, the file system obtains the full file name for the potentially matching directory entry. An illustrative directory entry type for storing directory entry full file names is described above with regard to data components 600 (FIG. 6). At decision block 1112, a test is conducted to determine whether the target file name matches the full file name of the potentially matching directory entry. If so, the routine 1100 terminates by reporting a conflict and the file system will be required to select a new file name. If the full file does not match, the routine 1100 will return to block 1106 to continue checking hash values for all the directory entries in the file system.

In accordance with an aspect of the present invention, various additional functionality may be added through the specification of specific directory types. For example, name streams may be supported by specifying a name stream directory entry. Additionally, on-disk encryption may also be supported through the utilization of specific encryption algorithms and key exchanges. Still further, time zone conversions may be associated with directory entries to automatically convert a current time zone with a time zone with the directory entry was made.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computing device comprising a file system and a computer-readable medium that stores information within a volume on the computer readable storage medium, comprising:
   the volume stored on the computing device, the volume comprising:
   a file allocation table component comprising a file allocation table for use by the file system; and
   a plurality of primary directory entries configured to specify data in a file system, each primary directory entry comprising type information designating that primary directory entry as either a critical primary directory entry or a benign primary directory entry;
   the file system, when enumerating directory entries during a process of mounting the volume, identifying each primary directory entry as a critical primary directory entry or a benign primary directory entry based on its type information;
   the file system, when enumerating directory entries during a process of mounting the volume, preventing the volume from being mounted when the file system does not recognize any primary directory entries identified, using their respective type information, as a critical primary directory entry; and
   the file system, after the volume has been mounted and during a file access operation, ignoring a primary directory entry identified, using its type information, as a benign primary directory entry when the file system does not recognize the benign primary directory entry.

2. The computing device recited in claim 1, the volume further comprising at least one secondary directory entry corresponding to a primary directory entry, the secondary directory entry comprising type information designating that secondary directory entry as either a critical secondary directory entry or a benign secondary directory entry; and
   the file system, when enumerating secondary directory entries during a process of mounting the volume, identifying each secondary directory entry as a critical secondary directory entry or a benign secondary directory entry based on its type information.

3. The computing device recited in claim 2, the file system, after the volume has been mounted, ignoring a secondary directory entry identified, by its type information, as a critical secondary directory entry, and the primary directory entry to which it corresponds, when the file system does not recognize the critical secondary directory entry.

4. The computing device recited in claim 2, the file system, after the volume has been mounted, ignoring a secondary directory entry identified, by its type information, as a benign secondary directory entry when the file system does not recognize the benign secondary directory entry.

5. A method for use by a file system of a computing device when accessing information stored on a volume, the volume being stored on one of a plurality of different computer storage mediums that may be connected to the computing device, wherein the volume stored on a computer storage medium connected to the computing device comprises a plurality of primary directory entries, each of the plurality of primary directory entries containing type information designating the primary directory entry as either a critical primary directory entry or a benign primary directory entry, the method comprising:
   reading, during a process of mounting the volume stored on the computer storage medium connected to the computing device, a primary directory entry designated by its type information as a critical primary directory entry;

determining whether the critical primary directory entry is recognized;

based on a determination that the critical primary directory entry is not recognized, preventing the volume from being mounted; and during a file access operation and after the volume has been mounted;

reading a primary directory entry designated by its type information as a benign primary directory entry, determining whether the benign primary directory entry is recognized, and based on a determination that the benign primary directory entry is not recognized, ignoring the benign primary directory entry.

6. The method of claim 5, wherein the volume further comprises a plurality of secondary directory entries, each secondary directory entry being associated with a primary directory entry and defining metadata associated with the associated primary directory entry, each secondary directory entry further containing type information designating that secondary directory entry as either a critical secondary directory entry or a benign secondary directory entry, the method further comprising:

reading a secondary directory entry designated by its type information as a critical secondary directory entry, that critical secondary directory entry being associated with a primary directory entry;

determining whether the critical secondary directory entry is recognized; and based on a determination that the critical secondary directory entry is not recognized, ignoring the critical secondary directory entry and its associated primary directory entry.

7. The method of claim 5, further comprising:

reading a secondary directory entry designated by its type information as a benign secondary directory entry;

determining whether the benign secondary directory entry is recognized; and based on a determination that the benign secondary directory entry is not recognized, ignoring the benign secondary directory entry.

8. A computer-readable storage medium on which computer-executable instructions are stored, the computer-executable instructions, when executed by a computing device, implementing a method for use by a file system of the computing device when accessing information stored on a volume, the volume being stored on one of a plurality of different computer storage mediums that may be connected to the computing device, the volume stored on a computer storage medium connected to the computing device comprising a plurality of primary directory entries, each of the plurality of primary directory entries containing type information designating the primary directory entry as either a critical primary directory entry or a benign primary directory entry, the method implemented by the computer-executable instructions comprising:

reading, during a process of mounting the volume stored on the computer storage medium connected to the computing device, a primary directory entry designated by its type information as a critical primary directory entry;

determining whether the critical primary directory entry is recognized;

based on a determination that the critical primary directory entry is not recognized, preventing the volume from being mounted; and during a file access operation and after the volume has been mounted;

reading a primary directory entry designated by its type information as a benign primary directory entry, determining whether the benign primary directory entry is recognized, and based on a determination that the benign primary directory entry is not recognized, ignoring the benign primary directory entry.

9. The computer-readable medium recited in claim 8, wherein the volume further comprises a plurality of secondary directory entries, each secondary directory entry being associated with a primary directory entry and defining metadata associated with the associated primary directory entry, each secondary directory entry further containing type information designating that secondary directory entry as either a critical secondary directory entry or a benign secondary directory entry, and wherein the method implemented by the computer-executable instructions further comprises:

reading a secondary directory entry designated by its type information as a critical secondary directory entry, the critical secondary directory entry being associated with a primary directory entry;

determining whether the critical secondary directory entry is recognized; and based on a determination that the critical secondary directory entry is not recognized, ignoring the critical secondary directory entry and its associated primary directory entry.

10. The computer-readable medium recited in claim 8, wherein the method implemented by the computer-executable instructions further comprises:

reading a secondary directory entry designated by its type information as a benign secondary directory entry;

determining whether the benign secondary directory entry is recognized; and based on a determination that the benign secondary directory entry is not recognized, ignoring the benign secondary directory entry.

11. A computing device having a file system that may access information stored on a volume, the volume being stored on one of a plurality of different computer storage mediums that may be connected to the computing device, wherein the volume stored on a computer storage medium that may be connected to the computing device comprises a plurality of primary directory entries, each of the plurality of primary directory entries containing type information designating the primary directory entry as either a critical primary directory entry or a benign primary directory entry, the computing device being configured to:

read, during a process of mounting the volume stored on the computer storage medium connected to the computing device, a primary directory entry designated by its type information as a critical primary directory entry;

determine whether the critical primary directory entry is recognized;

based on a determination that the critical primary directory entry is not recognized, prevent the volume from being mounted; and during a file access operation and after the volume has been mounted;

read a primary directory entry designated by its type information as a benign primary directory entry, determine whether the benign primary directory entry is recognized, and based on a determination that the benign primary directory entry is not recognized, ignore the benign primary directory entry.

12. The computer device of claim 11, wherein the volume further comprises a plurality of secondary directory entries, each secondary directory entry being associated with a primary directory entry and defining metadata associated with the associated primary directory entry, each secondary directory entry further containing type information designating that secondary directory entry as either a critical secondary directory entry or a benign secondary directory entry, the computer device further configured to:

read a secondary directory entry designated by its type information as a critical secondary directory entry, that critical secondary directory entry being associated with a primary directory entry;

determine whether the critical secondary directory entry is recognized; and based on a determination that the critical secondary directory entry is not recognized, ignore the critical second ary directory entry and its associated primary directory entry.

13. The computer device of claim 11 further configured to:

read a secondary directory entry designated by its type information as a benign secondary directory entry;

determine whether the benign secondary directory entry is recognized; and based on a determination that the benign secondary directory entry is not recognized, ignore the benign secondary directory entry.

14. The computing device recited in claim 1, wherein the file access operation is a file open operation.

15. The method of claim 5, wherein the file access operation is a file open operation.

16. The computer-readable medium recited in claim 8, wherein the file access operation is a file open operation.

17. The computer device of claim 11, wherein the file access operation is a file open operation.

* * * * *